United States Patent
Fanton et al.

(10) Patent No.: US 11,279,500 B2
(45) Date of Patent: Mar. 22, 2022

(54) CONNECTED MEASURING DEVICE FOR AN AIRCRAFT

(71) Applicant: SAFRAN ELECTRONICS & DEFENSE, Paris (FR)

(72) Inventors: Nicolas Fanton, Paris (FR); Louis-Théophile Thirion, Paris (FR); Rémy Hoff, Paris (FR); Emmanuel Couturier, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/269,451

(22) PCT Filed: Aug. 22, 2019

(86) PCT No.: PCT/EP2019/072513
§ 371 (c)(1),
(2) Date: Feb. 18, 2021

(87) PCT Pub. No.: WO2020/048788
PCT Pub. Date: Mar. 12, 2020

(65) Prior Publication Data
US 2021/0245899 A1    Aug. 12, 2021

(30) Foreign Application Priority Data
Sep. 3, 2018  (FR) ...................................... 1857893

(51) Int. Cl.
*B64F 5/60*      (2017.01)
*G07C 5/00*     (2006.01)
*G07C 5/08*     (2006.01)

(52) U.S. Cl.
CPC ................ *B64F 5/60* (2017.01); *G07C 5/008* (2013.01); *G07C 5/0808* (2013.01)

(58) Field of Classification Search
CPC .......... B64F 5/60; G07C 5/0808; G07C 5/008
See application file for complete search history.

(56) References Cited

U.S. PATENT DOCUMENTS 6,115,656 A * 9/2000 Sudolsky .................. B64F 5/60
                                                                701/3
6,348,911 B1 * 2/2002 Rosenberg ............ A63F 13/285
                                                                345/161

(Continued)

FOREIGN PATENT DOCUMENTS

WO    2017/108848 A1    6/2017
WO    2017/216119 A1    12/2017

OTHER PUBLICATIONS

Oct. 24, 2019 International Search Report issued in International Patent Application No. PCT/EP2019/072513.
French Patent Application No. 17/58213 filed on Sep. 6, 2017.

*Primary Examiner* — Regis J Betsch
*Assistant Examiner* — Jeremy A Delozier
(74) *Attorney, Agent, or Firm* — Oliff PLC; R. Brian Drozd

(57) ABSTRACT

A device intended to be installed in an aircraft, the device being adapted for functioning in a first so-called "on the ground" operating mode or a second so-called "in flight" operating mode, the device includes a radio module compliant with a low power wide area network standard adapted for sending messages comprising data issuing from a sensor and supplied by an energy storage element, the device being adapted for: (1) in the first operating mode: before the sending of each message, charging the energy storage element with a predefined energy, and (2) in the second operating mode: for each message to be sent, choosing a transmission power, determining, according to this transmission power, an energy necessary for the sending of the message by the radio module, and before the sending of the (Continued)

message, charging the energy storage element with the necessary energy determined.

7 Claims, 2 Drawing Sheets

(56) References Cited

U.S. PATENT DOCUMENTS

2005/0148327 A1* 7/2005 Perez .................... H04L 41/069
                                                              455/431
2019/0118978 A1* 4/2019 Fanton ...................... B64F 5/60

* cited by examiner

CONNECTED MEASURING DEVICE FOR AN AIRCRAFT

TECHNICAL FIELD

The present invention relates to the technical field of monitoring systems for an aircraft.

PRIOR ART

The French patent application No. 17 58213 filed on 6 Sep. 2017 discloses a monitoring system for an aircraft, the monitoring system comprising measuring devices and a reception terminal compliant with a low power wide area network (or LPWAN) standard installed in an aircraft. This network is for example a so-called LoRaWAN network as defined by the LoRa Alliance (see https://lora-alliance.org/). Each measuring device disclosed comprises:
- a sensor arranged to measure at least one parameter of the aircraft,
- an antenna compliant with the low power wide area network standard and a transmitter compliant with the same standard,
- a self-contained electrical supply source that supplies the measuring device,
- a main cutoff module connected between the electrical supply source and the transmitter,
- a management module arranged to monitor the operating parameters of the transmitter and to selectively open and close the cutoff module according to the operating parameters.

Thus each measuring device can physically cut off the electrical supply of its transmitter in the event of a problem, which guarantees that the transmitter can under no circumstances emit radio energy that is not in accordance with an aeronautical standard such as the RTCA DO-160 Section 21.

This patent application discloses that the measuring devices comprise two operating modes: a first operating mode corresponding overall to a phase where the aircraft is moving (taxiing phase, takeoff, climb, flight, descent, landing and final taxiing) and a second operating mode corresponding to a phase where the aircraft is immobile (or parking phase). The measuring devices comprise means (for example accelerometer and/or gyroscope) for detecting the flight phase in which the aircraft wherein the measuring device is installed is situated. According to this document, the sending of a radio signal by a measuring device is deactivated when the measuring device is in the first operating mode, that is to say when the aircraft is in flight or in movement. Thus, obviously, in this first operating mode, each measuring device is in conformity with the radio interference standards since it is not in a position to send radio signals.

However, the system disclosed by the document cited makes it necessary to await a phase of immobilisation of the aircraft (that is to say the second operating mode of the measuring devices) in order to be able to collect data measured by the sensors of the measuring devices. This is particularly problematic if for example the measuring device is supposed to allow the monitoring of a physical parameter such as the temperature of a refrigerated container, and to alert if this temperature exceeds a certain threshold: the device is then not in a position to send an alert except once the aircraft is immobilised on the runway. Though this can make it possible to know after the event that a temperature problem has taken place with the container during the flight, it is however probably too late to act and correct the problem. Moreover, though it is thus desirable to be able to collect data measured during flight phases, it is necessary at the same time to ensure that the electrical consumption of the measuring devices remains as low as possible, the possibility of action for changing or recharging power supplies of the measuring devices in flight phase being non-existent.

DISCLOSURE OF THE INVENTION

The invention relates to a measuring device for a monitoring system intended to be installed in an aircraft, the measuring device being adapted for functioning in accordance with a first operating mode referred to as "on the ground" or a second operating mode referred to as "in flight". The measuring device comprises:
- a sensor adapted for measuring at least one physical parameter of the environment of the aircraft,
- a radio module compliant with a low power wide area network standard, the radio module being adapted for sending messages comprising measurement data issuing from the sensor to a radio access point, the radio module being adapted for sending each message with a transmission power chosen from a predefined plurality of transmission powers,
- an electrical supply source,
- a module for managing the electrical supply connected to provide cutoff between the radio module and the electrical supply module, the module managing the supply being an energy storage element for supplying the radio module,
- a control module, the control module being adapted for switching the operating mode of the measuring device between the first so-called "on the ground" operating mode and the second so-called "in flight" operating mode.

Said measuring device is adapted for:
in the first so-called "on the ground" operating mode:
  before the sending of each message, charging the energy storage element with a predefined energy supplied by the electrical supply source,
in the second so-called "in flight" operating mode:
  for each message to be sent, choosing a transmission power of the radio module,
  determining, according to this transmission power, an energy necessary for the sending of the message by the radio module,
  before the sending of the message, charging the energy storage element with the necessary energy determined and supplied by the electrical supply source.

According to a complementary embodiment of the invention, the radio module furthermore being adapted for sending a message according to a spread factor, the spread factor being chosen from a predefined plurality of spread factors, the measuring device is adapted, in the second so-called "in flight" operating mode, for:
  for each message to be sent, choosing a transmission power of the radio module and a spread factor,
  determining the energy necessary for the sending of the message by the radio module according to the transmission power chosen and the spread factor chosen.

According to a complementary embodiment of the invention, the measuring device is adapted, in the second so-called "in flight" operating mode, following the sending of a message by the radio module with a first power and according to a first spread factor, and in the absence of acknowledgement response from the radio access point:

for choosing a second transmission power of the radio module and a second spread factor, for resending the message, the second transmission power and the second spread factor corresponding to an entry in a predetermined list, the list comprising the plurality of pairs formed by the plurality of transmission powers and the plurality of spread factors, each pair being associated with an energy necessary for sending a message with the transmission power of the pair and in accordance with the spread factor of the pair, the list being ordered according to the energy necessary for sending the message associated with each pair, the second transmission power and the second spread factor corresponding to the pair following the pair formed by the first transmission power and the first spread factor.

According to a complementary embodiment of the invention, the list does not comprise the pairs formed by a transmission power and a spread factor requiring an energy for sending a message higher than a predetermined energy threshold.

According to a complementary embodiment of the invention, a list is associated with each size of a message to be sent.

According to a complementary embodiment of the invention, the module for managing the electrical supply comprises a coulomb meter.

The invention also relates to a monitoring system of an aircraft, the system comprising:
    a plurality of measuring devices according to one of the preceding claims,
    a radio access point, the radio access point being connected to an item of equipment of the aircraft.

BRIEF DESCRIPTION OF THE DRAWINGS

The features of the invention mentioned above, as well as others, will emerge more clearly from a reading of the following description of an example embodiment, said description being made in relation to the accompanying drawings, among which.

DETAILED DISCLOSURE OF EMBODIMENTS

Figure 1:
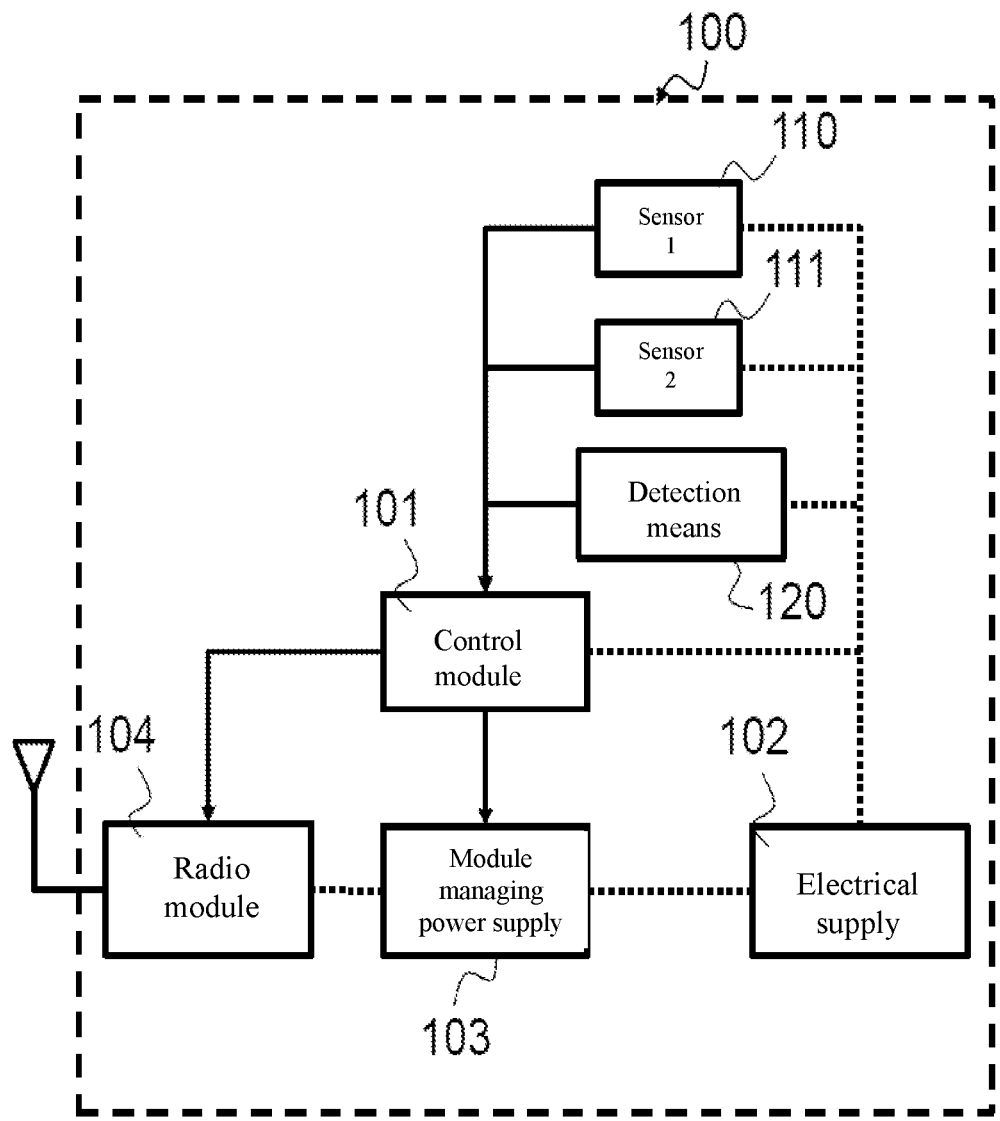
FIG. 1 illustrates schematically the hardware architecture of a measuring device according to one embodiment of the invention.

FIG. 1 illustrates schematically the hardware architecture of a measuring device 100 according to one embodiment of the invention.

The measuring device 100 is intended to be integrated in a monitoring system installed in an aircraft. The measuring device 100 is adapted for functioning according to a first operating mode referred to as "on the ground" or a second operating mode referred to as "in flight". The first operating mode corresponds to a phase where the aircraft is moving (taxiing, takeoff, climbing, flight, descent, landing and final taxiing phase). The second operating mode corresponding to a phase where the aircraft is immobile (or parking phase).

The measuring device 100 comprises:
    one or more sensors 110, 111 adapted for measuring physical parameters of the environment of the aircraft,
    a radio module 104 compliant with a low power wide area network standard, the radio module 104 being adapted for sending messages comprising measuring data issuing from one of the sensors 110, 111 to a radio access point, the radio module being adapted for sending each message with a transmission power chosen from a predefined plurality of transmission powers,
    an electrical supply source 102,
    a module 103 for managing the electrical supply connected as a cutoff between the radio module 104 and the electrical supply module 102, the electrical-supply management module 103 comprising an energy storage element for supplying the radio module,
    a control module 101, the control module 101 being adapted for switching the operating mode of the measuring device between the first operating mode known as "on the ground" and the second operating mode known as "in flight".

The control module 101 may comprise or be connected to detection means 120, these detection means being adapted for detecting whether the aircraft is in flight or immobilised on the ground. These detection means 120 typically comprise a gyroscope and/or an accelerometer.

The electrical-supply management module 103 makes it possible to guarantee that the radio module 104 is supplied only by a controlled amount of electrical energy. According to one embodiment of the invention, the module 103 for managing the electrical supply comprises an electrical capacitor. This capacitor can be charged with a variable amount of electrical energy, this variable amount of electrical energy being determined for example by the control module 101 and supplied by the electrical supply source. The maximum amount of energy that can be stored by the capacitor, that is to say the maximum capacitance of the capacitor, can be chosen so as to prevent the radio module 104 from emitting more than a certain radio energy in order to be in compliance with a radio interference standard.

According to a complementary embodiment of the invention, the electrical-supply management module 103 may comprise a so-called coulomb meter in order to measure the electrical energy transmitted to the radio module 104. Thus the electrical-supply management module can cut off the electrical supply of the radio module as soon as a predefined amount of energy, or one defined by the control module 101, has been transmitted to the radio module 104 for sending a message.

Thus the measuring device 100 is adapted, in the first operating mode known as "on the ground",
    before the sending of each message, for charging the energy storage element with a predefined energy.

The measuring device 100 can thus send a message via the radio module 104, the module 103 for managing the electrical supply guaranteeing that the ratio module cannot send more than the maximum authorised energy corresponding to the energy stored in the storage element, modulo the energy losses inherent in the functioning of the radio module 104.

Likewise, the measuring device 100 is adapted, in the second operating mode known as "in flight", for:
    for each message to be sent, choosing a transmission power of the radio module,
    determining, according to this transmission power, an energy necessary for the sending of the message by the radio module,
    before the sending of the message, charging the energy storage element with the necessary energy determined.

When the measuring device 100 is in the second so-called "in flight" operating mode, it is desirable to commence by sending a message with the lowest possible transmission power. If the message sent is not received by the access point, which can be deduced if the measuring device 100 does not receive any acknowledgement message from the access point following the sending of the message, then the transmission power of the radio module 104 is gradually increased until the moment when an acknowledgement is finally received. The transmission power can then be kept for future messages. Periodically, this sequence of sending a message with an increasing transmission power can be repeated in order to guarantee that the radio module 104 is transmitting with a minimum power.

According to one embodiment, the measuring device 100 is characterised in that the radio module is also adapted for sending a message according to a radio spectrum spread factor. This "spread" technology makes it possible to spread a radio signal over a broad frequency spectrum by means of the use of a code. This is for example the case with a so-called "LoRa" radio technology developed by the LoRa Alliance. The spread factor may be chosen from a predefined plurality of spread factors.

The measuring device 100 is then adapted, when it is functioning in the second so-called "in flight" operating mode, for:

for each message to be sent, choosing a transmission power of the radio module and a spread factor, determining the energy necessary for sending the message by the radio module according to the transmission power chosen and the spread factor chosen.

The relationship between the transmission power of a radio signal sent by the radio module 104, the spread factor used for this transmission and the electrical energy (here in nA.h) necessary for this transmission is not trivial, as shown by the following table:

TABLE 1A

| Spread Factor | bits/s | Transmission power (dBm) | | | | | |
|---|---|---|---|---|---|---|---|
| | | 14 | 13 | 12 | 11 | 10 | 9 |
| | | Transmission power (mW) | | | | | |
| | | 25 | 20 | 16 | 12.5 | 10 | 8 |
| SF7 | 5470 | 3.047 | 2.438 | 1.950 | 1.523 | 1.219 | 0.975 |
| SF8 | 3125 | 5.333 | 4.267 | 3.413 | 2.667 | 2.133 | 1.707 |
| SF9 | 1760 | 9.470 | 7.576 | 6.061 | 4.735 | 3.788 | 3.030 |
| SF10 | 980 | 17.007 | 13.605 | 10.884 | 8.503 | 6.603 | 5.442 |
| SF11 | 540 | 30.864 | 24.691 | 16.753 | 15.432 | 12.346 | 9.877 |
| SF12 | 290 | 57.471 | 45.977 | 36.782 | 28.736 | 22.989 | 18.391 |

TABLE 1B

| Spread Factor | bits/s | Transmission power (dBm) | | | | | |
|---|---|---|---|---|---|---|---|
| | | 8 | 7 | 6 | 5 | 4 | 3 |
| | | Transmission power (mW) | | | | | |
| | | 6.3 | 5 | 4 | 3.2 | 2.5 | 2 |
| SF7 | 5470 | 0.768 | 0.609 | 0.488 | 0.390 | 0.305 | 0.244 |
| SF8 | 3125 | 1.344 | 1.067 | 0.853 | 0.683 | 0.533 | 0.427 |
| SF9 | 1760 | 3.386 | 1.894 | 1.515 | 1.212 | 0.947 | 0.758 |
| SF10 | 980 | 4.286 | 3.401 | 2.721 | 2.177 | 1.701 | 1.361 |
| SF11 | 540 | 7.778 | 6.173 | 4.938 | 3.951 | 3.086 | 2.469 |
| SF12 | 290 | 14.483 | 11.494 | 9.195 | 7.356 | 5.747 | 4.598 |

TABLE 1C

| Spread Factor | bits/s | Transmission power (dBm) | | | | | |
|---|---|---|---|---|---|---|---|
| | | 2 | 1 | 0 | −1 | −2 | −3 |
| | | Transmission power (mW) | | | | | |
| | | 1.6 | 1.3 | 1 | 0.8 | 0.6 | 0.5 |
| SF7 | 5470 | 0.195 | 0.158 | 0.122 | 0.098 | 0.073 | 0.061 |
| SF8 | 3125 | 0.341 | 0.277 | 0.213 | 0.171 | 0.128 | 0.107 |
| SF9 | 1760 | 0.606 | 0.492 | 0.379 | 0.303 | 0.227 | 0.189 |
| SF10 | 980 | 1.088 | 0.884 | 0.680 | 0.544 | 0.408 | 0.340 |
| SF11 | 540 | 1.975 | 1.605 | 1.235 | 0.988 | 0.741 | 0.617 |
| SF12 | 290 | 3.678 | 2.989 | 2.299 | 1.839 | 1.379 | 1.149 |

This table gives, for a given pair consisting of a transmission power and a spread factor, the energy necessary for transmitting a message of a predetermined size, the size of a message being dependent in particular on the payload of the message. It should be noted that this table is an example for a given message size, another table having to be determined for a different message size.

This table must be determined in a prior configuration phase for a radio module 104 and for each size of a message potentially sent by the radio module 104.

This table may be generated from a few measurements, the other data being able then to be calculated.

This table may be presented in a different, but equivalent, form of a list comprising transmission power and spread factor pairs, each pair being associated with an energy necessary for a sending of a message of a predefined size.

This list is advantageously ordered, from the lowest necessary energy to the highest.

For example, the list may here commence with the pair (P=−3 dBm; SF=7) associated with the energy 0.061 nA.h. The last element in the list is here the pair (P=14 dBm; SF=12), associated with the necessary energy 57.471 nA.h (with P standing for transmission power and SF for spread factor).

It should be noted that, for equal transmission powers, the sending of a message with a high spread factor (SF=12 for example) reduces the available bandwidth (here 290 bits/s as against 5470 bits/s with an SF of 7) and therefore requires transmitting for longer, which explains the higher energy necessary. On the other hand, the transmission range of the message is then greater.

Once the table—or ordered list—has been produced, the measuring device 100 can choose the pairs (transmission power; spread factor) in an increasing order of energy necessary, and test each pair until it finds the one making it possible to receive an acknowledgement. This pair is then the one that allows good reception of a message sent with a minimum energy consumed during transmission. The electrical consumption of the measuring device 100 is then at a minimum. The electrical supply 102 is then preserved for better longevity.

Thus, when, in the second so-called "in flight" operating mode, the measuring device 100 is adapted, following the sending of a message by the radio module with a first power and in accordance with a first spread factor, and in the absence of an acknowledgement response from the radio access point:

for choosing a second transmission power of the radio module and a second spread factor, in order to resend the message.

The second transmission power and the second spread factor correspond to an entry in the predetermined list (or in the table), the list comprising the plurality of pairs formed by the plurality of transmission powers and the plurality of spread factors, each pair being associated with an energy necessary for sending a message with the transmission power of the pair and in accordance with the spread factor of the pair, the list being ordered according to the energy necessary for sending the message associated with each pair, the second transmission power and the second spread factor corresponding to the pair following the pair formed by the first transmission power and the first spread factor.

A list is associated with each size of message to be sent. Each list is generated or predetermined during a phase of configuration of the measuring device 100.

According to a complementary embodiment of the invention, the list does not comprise the pairs formed by a transmission power and a spread factor requiring an energy for sending a message higher than a predetermined energy threshold. In other words, it is possible to refrain from using transmission power and spread factor pairs that would lead to an excessive consumption of electrical energy and/or to sending radio signals exceeding a predetermined radio energy.

Figure 2:
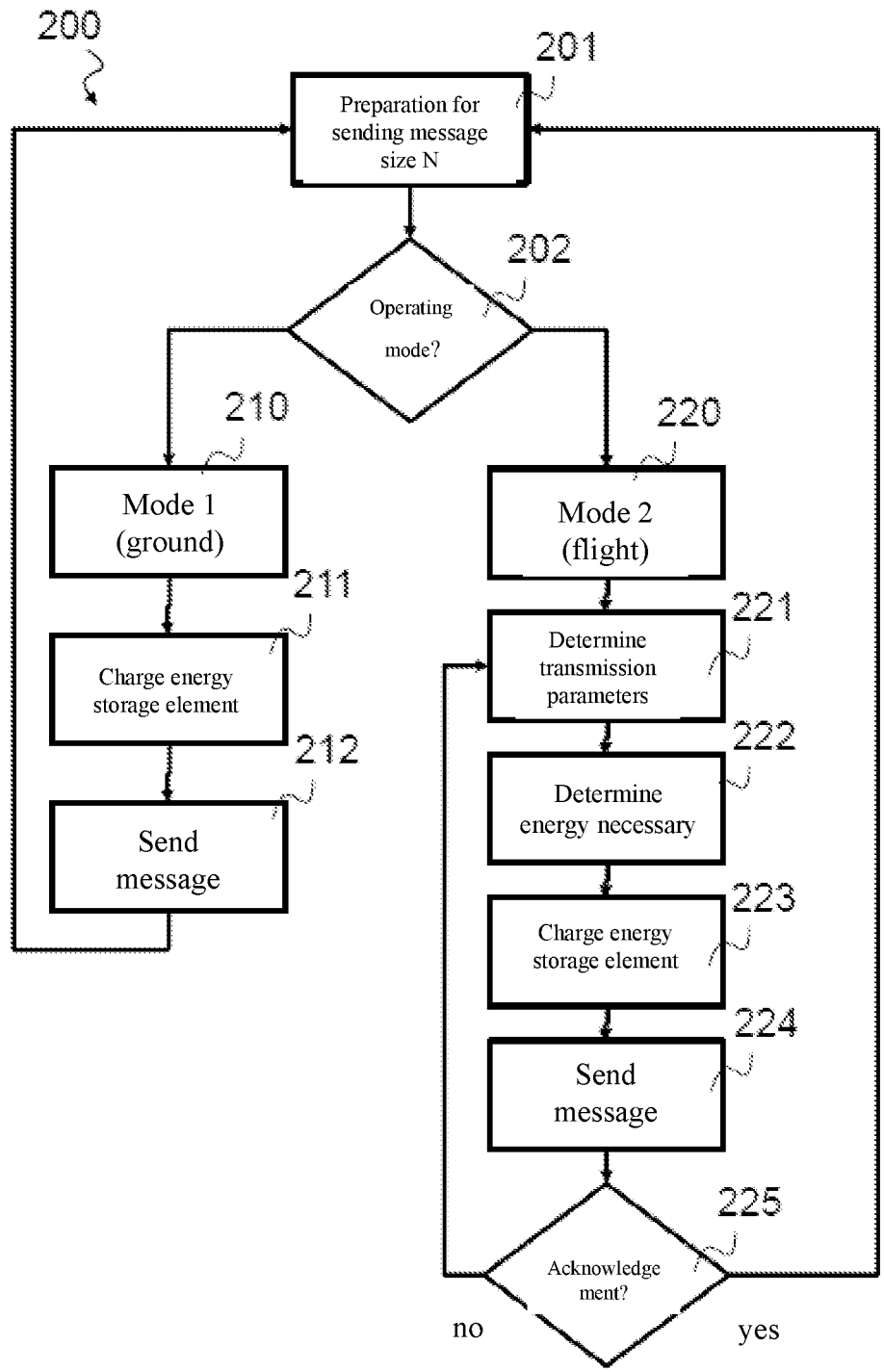
FIG. 2 illustrates schematically a method for sending a message by a measuring device according to one embodiment of the invention.

FIG. 2 illustrates schematically a method for sending a message by a measuring device 100 according to one embodiment of the invention.

In a first step 201, the measuring device 100 determines that a message is to be sent. The message may comprise data issuing from measurements made by one of the sensors 101, 111. The need to send a message may be triggered by a threshold being exceeded by one of the measurements of one of the sensors 110, 111 or be triggered periodically.

In a following step 202, the measuring device 100 determines its operating mode. This operating mode is determined by the control module 101, possibly in accordance with data issuing from the detection means 120, which may comprise a gyroscope and/or an accelerometer. The operating mode may correspond to a state of a so-called "flag" memory, this memory being updated periodically or on demand according to the data from the detection means 120.

If the measuring device 100 determines that it is in the first operating mode, corresponding to an aircraft on the ground (immobilised on the ground or parking), the measuring device 100 passes to a step 210.

If the measuring device 100 determines that it is in the second operating mode, corresponding to an aircraft in flight, the measuring device 100 passes to a step 220. It should be noted that, according to one embodiment of the invention, if it is not possible to determine an operating mode, the measuring device considers that it is in the second operating mode.

In the first operating mode, following the step 210, according to one embodiment of the invention, the measuring device 100, in a step 211, charges the electrical energy storage element of the electrical-supply management module 103 with a predetermined energy. This predetermined energy corresponds to a maximum transmission energy that the radio module 104 must not exceed in its message transmissions.

In a following step 212, the radio module 104 can send the message, the energy made available by the electrical-supply management module 103 guaranteeing that the radio module 104 will not be able, in this transmission, to exceed a maximum energy for example defined by a standard.

In the second operating mode, following the step 220, according to one embodiment of the invention, the measuring device 100, in a step 221, determines transmission parameters for the message. These transmission parameters comprise for example a transmission power and a spread factor. These parameters can be found in a table or an ordered list comprising for example pairs (transmission power; spread factor) ordered according to the energy necessary for the transmission in accordance with the parameters defined for each pair. Typically, the measuring device, in a first step 221, chooses the first element in the ordered list corresponding to a minimum energy necessary.

In a following step 222, the measuring device 100 determines the energy necessary for the transmission of the message with the parameters previously determined. This necessary energy can be defined in association with each pair in the list, and it can therefore easily be found again. Alternatively, the measuring device 100 may apply correction factors in order to take account of the energy loss during the transmission of a message.

In a following step 223, the measuring device 100 configures the electrical-supply management module 103 so that it cannot supply more electrical energy than the energy previously determined to the radio module 104. According to one embodiment of the invention, the measuring device 100 charges an electrical energy storage element with the necessary energy previously determined. This storage element is for example a capacitor. According to a complementary embodiment, the measuring device 100 configures a meter of the coulomb type—included in the module 103 for managing the electrical supply—so that the electrical supply to the radio module 104 is cut off as soon as a threshold energy value transmitted to the radio module 104 is exceeded.

In a following step 224, the radio module 104 sends the message. The radio module 104 cannot exceed a maximum energy value sent, which is controlled according to the necessary energy configured by the electrical-supply management module 103 during the step 223.

In a following step 225, and possibly after a predetermined waiting time, the measuring device 100 checks whether an acknowledgement has been received indicating the good reception of the message sent.

If the message is indeed acknowledged (return to the step 201 or to the step 220 as long as the measuring device remains in the second operating mode), then the message ends until a next message is sent. Possibly then, the transmission and spread factor pair is kept in memory. During a new step 221 performed for a new message to be sent of the same size, the measuring device can advantageously use these parameters kept in memory. This can avoid recommencing a phase of testing a plurality of parameters which in the end do not allow a good reception of messages. Conversely, it may be useful to periodically validate that the parameters chosen are indeed the most economical in terms of energy necessary. Thus a validity time may be associated with parameters determined during a step 221, and used for sending a message, following the reception of an acknowledgement during a step 225.

If the message is not acknowledged, then the measuring device 100 recommences a step 221 by choosing in the table or the ordered list the following parameters or (transmission power; spread factor) pair, that is to say those requiring an energy just greater. The method is thus repeated, with on each occasion an increasing necessary energy, until the moment when an acknowledgement is received. It is thus possible to determine the transmission power and spread factor parameters guaranteeing a minimum power consumption of the radio module 104, and therefore of the measuring device 100.

The invention claimed is:

1. A measuring device for a monitoring system intended to be installed in an aircraft, the measuring device being adapted for functioning in accordance with a first operating mode referred to as "on the ground" or a second operating mode referred to as "in flight", the measuring device comprising:
- a sensor adapted for measuring at least one physical parameter of the environment of the aircraft,
- a radio module comprising a transmitter and being compliant with a low power wide area network standard, the radio module being adapted for sending messages comprising measurement data issuing from the sensor to a radio access point, the radio module being adapted for sending each message with a transmission power chosen from a predefined plurality of transmission powers,
- an electrical supply source,
- a managing module comprising an energy storage circuit for supplying the radio module and being configured for managing the electrical supply connected to provide cutoff between the radio module and the electrical supply module, and
- a control module comprising a hardware processor that is adapted for switching the operating mode of the measuring device between the first so-called "on the ground" operating mode and the second so-called "in flight" operating mode, wherein
  in the first so-called "on the ground" operating mode:
    before the sending of each message, the energy storage element is charged with a predefined energy supplied by the electrical supply source,
  in the second so-called "in flight" operating mode:
    for each message to be sent, a transmission power of the radio module is chosen,
    according to this transmission power, an energy necessary for the sending of the message by the radio module is determined, and
    before the sending of the message, the energy storage element is charged with the necessary energy determined and supplied by the electrical supply source.

2. The measuring device according to claim 1, wherein the radio module furthermore comprises circuitry for sending a message according to a spread factor, the spread factor being chosen from a predefined plurality of spread factors, the measuring device being adapted, in the second so-called "in flight" operating mode, for:
  for each message to be sent, choosing a transmission power of the radio module and a spread factor,
  determining the energy necessary for the sending of the message by the radio module according to the transmission power chosen and the spread factor chosen.

3. The measuring device according to claim 2, further comprising circuitry for, in the second so-called "in flight" operating mode, following the sending of a message by the radio module with a first power and according to a first spread factor, and in the absence of acknowledgement response from the radio access point:
  circuitry for choosing a second transmission power of the radio module and a second spread factor, for resending the message,
the second transmission power and the second spread factor corresponding to an entry in a predetermined list, the list comprising the plurality of pairs formed by the plurality of transmission powers and the plurality of spread factors, each pair being associated with an energy necessary for sending a message with the transmission power of the pair and in accordance with the spread factor of the pair, the list being ordered according to the energy necessary for sending the message associated with each pair, the second transmission power and the second spread factor corresponding to the pair following the pair formed by the first transmission power and the first spread factor.

4. The measuring device according to claim 3, wherein list does not comprise pairs formed by a transmission power and a spread factor requiring an energy for sending a message higher than a predetermined energy threshold.

5. The measuring device according to claim 3, wherein the measuring device comprises a list associated with each size of a message to be sent.

6. The measuring device according to claim 1, wherein the managing module for managing the electrical supply further comprises a coulomb meter.

7. A monitoring system of an aircraft, the system comprising:
  a plurality of measuring devices according to claim 1,
  a radio access point, the radio access point being connected to an item of equipment of the aircraft.

* * * * *